US010767070B2

(12) United States Patent
Yun et al.

(10) Patent No.: US 10,767,070 B2
(45) Date of Patent: *Sep. 8, 2020

(54) PROCESS FOR PREPARING MULTI-COLOR DISPERSIONS AND MULTI-COLOR DISPERSIONS MADE THEREOF

(75) Inventors: Dong Yun, Shanghai (CN); Yujiang Wang, Shanghai (CN); Jian Sun, Shanghai (CN); Peng Xu, Shanghai (CN); Fei Guo, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/403,695

(22) PCT Filed: Jun. 6, 2012

(86) PCT No.: PCT/CN2012/076502
§ 371 (c)(1),
(2), (4) Date: Nov. 25, 2014

(87) PCT Pub. No.: WO2013/181800
PCT Pub. Date: Dec. 12, 2013

(65) Prior Publication Data
US 2015/0148457 A1 May 28, 2015

(51) Int. Cl.
*C09D 105/00* (2006.01)
*C09D 105/04* (2006.01)
*C09D 105/06* (2006.01)
*C09D 105/14* (2006.01)
*C09D 17/00* (2006.01)
*C09B 67/08* (2006.01)
*C09B 67/46* (2006.01)
*C09B 67/22* (2006.01)
*C09D 7/61* (2018.01)
*C09D 189/00* (2006.01)

(52) U.S. Cl.
CPC ........ *C09D 17/001* (2013.01); *C09B 67/0013* (2013.01); *C09B 67/0033* (2013.01); *C09B 67/0085* (2013.01); *C09D 7/61* (2018.01); *C09D 17/002* (2013.01); *C09D 105/00* (2013.01); *C09D 105/04* (2013.01); *C09D 189/00* (2013.01)

(58) Field of Classification Search
CPC ............ C09B 67/0013; C09B 67/0033; C09D 105/00; C09D 105/04; C09D 105/06; C09D 105/14; C08L 5/00; C08L 5/04
See application file for complete search history.

(56) References Cited

U.S. PATENT DOCUMENTS 2,591,904 A   4/1952  Zola
3,058,931 A * 10/1962 Petty ........................ C09D 5/29
                                                    260/DIG. 26
3,442,824 A   5/1969  Chandler et al.
3,458,328 A   7/1969  Zola
3,725,089 A * 4/1973  Zola ........................ B05D 5/06
                                                    106/15.05
3,950,283 A   4/1976  Sellars et al.
4,127,687 A  11/1978  Dupont
4,264,322 A   4/1981  Lewis et al.
4,385,097 A   5/1983  Isozaki et al.
4,826,535 A   5/1989  Godly
4,898,895 A   2/1990  Masuoka et al.
4,954,368 A   9/1990  Hartridge et al.
5,114,481 A   5/1992  Lynch
5,114,484 A   5/1992  Lynch
5,114,485 A   5/1992  Lynch et al.
5,199,801 A   4/1993  Grehn et al.
5,199,980 A   4/1993  Lynch et al.
5,268,030 A  12/1993  Floyd et al.
5,314,535 A   5/1994  Lynch et al.
5,318,619 A   6/1994  Lynch et al.
5,437,719 A   8/1995  Lynch et al.
5,480,480 A   1/1996  Lynch et al.
5,593,731 A   1/1997  Akagi
6,005,031 A  12/1999  Bremer-Masseus et al.
6,074,474 A   6/2000  Broome et al.
8,628,827 B2  1/2014  Espinosa
9,598,557 B2  3/2017  Wang et al.
2004/0225051 A1 11/2004 Moy
2005/0056187 A1  3/2005 Podlas
2005/0124759 A1  6/2005 Heldmann et al.
2006/0157196 A1  7/2006 Koepnick et al.
2006/0207476 A1  9/2006 Coward et al.
2008/0289538 A1 11/2008 Friedrich et al.
2009/0170978 A1  7/2009 Kelly
2010/0222459 A1  9/2010 Kelly et al.
(Continued)

FOREIGN PATENT DOCUMENTS

AU     560547 B2    4/1987
CA    1193372       9/1985
(Continued)

OTHER PUBLICATIONS

Machine Translation of JP 2006-199726; Terada; Aug. 2006.*
Partial Translation of, JP 2006-199726, into English; Aug. 2006; Terada et al.*
Chang et al.; "Effects of mixed hydrocolloids on water-based multicolor coatings"; J. of Beijing Univ. of Chem. Tech.; vol. 37; No. 4; (2010) 5 pages with English Abstract.
Final Office Action dated Sep. 12, 2016; U.S. Appl. No. 14/477,298, filed Sep. 4, 2014; 9 pages.
Non-Final Office Action dated May 2, 2016; U.S. Appl. No. 14/477,298, filed Sep. 4, 2014; 11 pages.
Thielking et al.; "Cellulose Ethers"; Ullmann's Encyclopedia of Industrial Chemistry; vol. 7; 2006; pp. 381-397.
(Continued)

*Primary Examiner* — Karuna P Reddy
(74) *Attorney, Agent, or Firm* — Karl E. Stauss; Cantor Colburn LLP

(57) ABSTRACT

This invention relates to a process for preparing multi-color dispersions and the multi-color dispersions made thereof.

9 Claims, No Drawings

(56) References Cited

U.S. PATENT DOCUMENTS

| | | |
|---|---|---|
| 2011/0236582 A1 | 9/2011 | Scheuing et al. |
| 2012/0094178 A1 | 4/2012 | Loveridge et al. |
| 2013/0045241 A1* | 2/2013 | Premachandran ..... A01N 47/04 424/400 |
| 2015/0059616 A1 | 3/2015 | Yun et al. |
| 2015/0065168 A1 | 3/2015 | Roskind et al. |
| 2015/0065618 A1 | 3/2015 | Yun et al. |
| 2015/0148457 A1 | 5/2015 | Yun et al. |
| 2017/0226364 A1 | 8/2017 | Zhang et al. |
| 2017/0298237 A1 | 10/2017 | Li et al. |
| 2017/0335133 A1 | 11/2017 | Zhang et al. |
| 2018/0044516 A1 | 2/2018 | Zhang et al. |

FOREIGN PATENT DOCUMENTS

| | | |
|---|---|---|
| CN | 1097782 A | 1/1995 |
| CN | 1117509 A | 2/1996 |
| CN | 1532240 | 9/2004 |
| CN | 101397483 A | 4/2009 |
| CN | 101397433 | 1/2012 |
| CN | 101397433 A | 1/2012 |
| CN | 104212276 A | 12/2014 |
| CN | 104212286 A | 12/2014 |
| CN | 104403470 A | 3/2015 |
| CN | 104449171 A | 3/2015 |
| EP | 0287589 A1 | 10/1988 |
| EP | 0424594 A1 | 5/1991 |
| EP | 505664 | 9/1992 |
| EP | 0505664 A1 | 9/1992 |
| EP | 0624181 | 11/1994 |
| EP | 624181 | 11/1994 |
| EP | 0780449 A2 | 6/1997 |
| EP | 896988 | 2/1999 |
| EP | 0896988 A1 | 2/1999 |
| EP | 0896989 A1 | 2/1999 |
| EP | 1004638 A2 | 5/2000 |
| EP | 2223940 A1 | 9/2010 |
| GB | 977145 A | 12/1964 |
| GB | 1441268 A | 6/1976 |
| GB | 2078243 | 1/1982 |
| GB | 2078243 A | 1/1982 |
| JP | 57133170 | 8/1982 |
| JP | 2657554 B2 | 6/1991 |
| JP | 2004182789 | 7/2004 |
| JP | 2006199726 A * | 8/2006 |
| JP | 03840280 | 11/2006 |
| JP | 2007231151 | 9/2007 |
| JP | 2007238919 | 9/2007 |
| JP | 2007262350 A | 10/2007 |
| JP | 2007296459 | 11/2007 |
| JP | 2007321045 | 12/2007 |
| JP | 2011052052 A | 3/2011 |
| JP | 5149602 B2 | 2/2013 |
| KR | 541628 B1 | 1/2006 |
| KR | 854445 B | 8/2008 |
| KR | 854445 B1 | 8/2008 |
| RU | 2238287 C2 | 10/2004 |
| WO | 9523197 A1 | 8/1995 |
| WO | 9532862 A1 | 12/1995 |
| WO | 1995032862 | 12/1995 |
| WO | 0036029 A1 | 6/2000 |
| WO | 2000036029 | 6/2000 |
| WO | 0248276 A1 | 6/2002 |
| WO | 2004046261 A2 | 6/2004 |
| WO | 2006029407 A2 | 3/2006 |
| WO | 2009133645 A1 | 11/2009 |
| WO | WO-2011071876 A1 * | 6/2011 |
| WO | 2013116004 A1 | 8/2013 |
| WO | 2013167243 A1 | 11/2013 |
| WO | 2013181800 A1 | 12/2013 |
| WO | 2016037312 A1 | 3/2016 |
| WO | 2016078020 A1 | 5/2016 |
| WO | 2016154879 A1 | 10/2016 |

OTHER PUBLICATIONS

International Search Report for International Application No. PCT/CN2014/091562; Date of Filing: Nov. 19. 2014; dated Jun. 15, 2015; 4 pages.

International Search Report; International Application No. PCT/CN2014/086127; International Filing Date Sep. 9, 2014; dated Apr. 27, 2015; 4 pages.

International Search Report; International Application No. PCT/CN2015/075462; International Filing Date Mar. 31, 2015; dated Jan. 12, 2016; 3 pages.

Written Opinion of the International Searching Authority for International Application No. PCT/CN2014/091562; Date of Filing: Nov. 19, 2014; dated Jun. 15, 2015; 4 pages.

Written Opinion of the International Searching Authority; International Application No. PCT/CN2015/075462; International Filing Date Mar. 31, 2015; dated Jan. 12, 2016; 4 pages.

Written Opinion of the International Searching Authority; International Application No. PCT/CN2014/086127; International Filing Date Sep. 9, 2014; dated Apr. 27, 2015; 3 pages.

U.S. Appl. No. 14/477,263, filed Sep. 4, 2014, US2015/0059616, U.S. Pat. No. 10,023,757.

U.S. Appl. No. 14/477,298, filed Sep. 4, 2014, US2015/0065618, U.S. Pat. No. 10,030,162.

U.S. Appl. No. 15/502,546, filed Feb. 8, 2017, US2017/0226364, U.S. Pat. No. 10,017,657.

U.S. Appl. No. 16/014,465, filed Jun. 21, 2018, US2018/0298226, U.S. Pat. No. 10,428,235.

* cited by examiner

_PROCESS FOR PREPARING MULTI-COLOR DISPERSIONS AND MULTI-COLOR DISPERSIONS MADE THEREOF_

FIELD

This invention relates to a process for preparing multi-color dispersions and the multi-color dispersions made thereof.

BACKGROUND

Multi-color coatings are water-based spray-on seamless alternative to traditional coatings. Multi-color coatings contain different colorants. After spraying, colorant particles are distributed on a surface to simulate a natural stone surface or another type of multi-color surface. The resultant ornamental and durable surface makes multi-color coating desirable for architectural renovation or new construction. The core part of a multi-color coating is the binder system protecting and separating colorant particles in coating emulsions, which binder system plays a critical role determining the cost and the performance of the final coatings.

Without the proper binder systems, multi-color coatings would require stringent storage and processing conditions. Colorants could easily escape from the coatings. The multi-color coatings could also look obviously unnatural.

Accordingly, it is still an interest in the art to find a process for preparing multi-color dispersions by selecting proper binder systems. Multi-color coatings made from such multi-color dispersions are stable, look natural upon application, economical, and environment friendly.

SUMMARY

The present invention relates to a process for making a multi-color dispersion comprising: i) contacting together a first colorant, a first aqueous dispersion of polymer particles, a first polysaccharide, and a second polysaccharide to make a first colorant dispersion; wherein the first colorant comprises from 0.1 wt. % to 15 wt. % of the first colorant dispersion, the first polymer particles comprise from 0.5 wt. % to 75 wt. % of the first colorant dispersion, and the first and second polysaccharides each independently comprise from 0.1 wt. % to 15 wt. % of the first colorant dispersion; ii) contacting the first colorant dispersion with a composition comprising a) a second aqueous dispersion of polymer particles and b) an ionic complexing agent to obtain a dispersion of protected first colorant particles; wherein the polymer particles comprise from 0.5 wt. % to 75 wt. % of the composition, and the ionic complexing agent comprises from 0.1 wt. % to 10 wt. % of the composition; iii) repeating steps i) and ii) with a second colorant that is different from the first colorant to obtain a dispersion of protected second colorant particles; and iv) mixing the dispersions of protected first and second colorant particles to obtain a multi-color dispersion; the weight: weight ratio of the first polysaccharide to the second polysaccharide is from 1:3 to 3:1.

Optionally, the first colorant dispersion further comprises from 0.1 wt. % to 1.6 wt. %, based on the total weight of the first colorant dispersion, an alginate, and the amount of the alginate is less than that of the second polysaccharide.

The present invention further relates to a multi-color dispersion comprising: a) an aqueous dispersion of polymer particles comprising from 1 wt. % to 60 wt. % based on the total weight of the multi-colored dispersion, polymer particles; b) from 0.1 wt. % to 10 wt. % based on the total weight of the multi-colored dispersion, a first polysaccharide selected from the group consisting of guar, pectin, carrageenan, and a mixture thereof; c) from 0.1 wt. % to 10 wt. % based on the total weight of the multi-colored dispersion, a second polysaccharide selected from the group consisting of gelatin, methyl cellulose, hydropropyl methyl cellulose, and a mixture thereof; d) from 0.1 wt. % to 5 wt. % based on the total weight of the multi-colored dispersion, an ionic complexing agent; e) from 0.1 wt. % to 5 wt. % based on the total weight of the multi-colored dispersion, a first colorant; and f) from 0.1 wt. % to 5 wt. % based on the total weight of the multi-colored dispersion, a second colorant; and the weight: weight ratio of the first polysaccharide to the second polysaccharide is from 1:3 to 3:1, and the first and the second colorant are separately protected in particles in the multi-color dispersion.

Optionally, the multi-color dispersion further comprises from 0.1 wt. % to 1 wt. % based on the total weight of the multi-color dispersion, an alginate, and the amount of the alginate is less than that of the second polysaccharide.

The present invention further provides a coating composition comprising the multi-color dispersion.

DETAILED DESCRIPTION

For the purpose of describing the components, all phrases comprising parenthesis denote either or both of the included parenthetical matter and its absence. For example, the phrase "(co)polymer" includes, in the alternative, polymer, copolymer and the mixture thereof; the phrase "(meth)acrylate" means acrylate, methacrylate, and the mixture thereof.

As used herein, the term "wt. %" refers to weight percentage.

The multi-color dispersion of the present invention comprises an aqueous dispersion of polymer particles comprising based on the total weight of the multi-color dispersion, from 1 wt. % to 60 wt. %, preferably from 2 wt. % to 50 wt. %, and preferably from 5 wt. % to 40 wt. %, polymer particles.

The polymer particles used in the present invention is the polymerization product of at least one ethylenically unsaturated nonionic monomer. Herein, "nonionic monomer" means that the copolymerized monomer residue does not bear an ionic charge between pH=1-14. The ethylenically unsaturated nonionic monomers used in the present invention include, for example, (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride.

The aqueous dispersion of polymer particles is typically formed by an addition polymerization emulsion polymerization process as is known in the art. Conventional surfactants and blends may be used, including, for example, anionic and/or nonionic emulsifiers such as alkali metal or ammonium alkyl sulfates, alkyl sulfonic acids, fatty acids, and oxyethylated alkyl phenols, and mixtures thereof. Polymerizable surfactants that include at least one ethylenically unsaturated carbon-carbon bond which can undergo free radical addition polymerization may be used. The amount of surfactants used is usually 0.1 wt. % to 6 wt. %, based on the weight of total monomer. Either thermal or redox initiation processes may be used. Conventional free radical initiators may be used, such as hydrogen peroxide, t-butyl hydroperoxide, t-amyl hydroperoxide, ammonium and/or alkali persulfates, typically at a level of 0.01 wt. % to 3.0 wt. %, based on the weight of total monomer. The monomer mixture may be added neat or as an emulsion in water. The monomer mixture may be added in a single addition or more additions or continuously over the reaction period using a uniform or varying composition. Additional ingredients such as free radical initiators, oxidants, reducing agents, chain transfer agents, neutralizers, surfactants, and dispersants may be added prior to, during, or subsequent to the monomer addition.

The multi-color dispersion of the present invention further comprises based on the total weight of the multi-color dispersion, from 0.1 wt. % to 10 wt. %, preferably from 0.2 wt. % to 7.5 wt. %, and preferably from 0.3 wt. % to 5 wt. %, a first polysaccharide.

Suitable first polysaccharides include, but are not limited to, guar, pectin, carrageenan, or the mixture thereof.

The multi-color dispersion of the present invention further comprises based on the total weight of the multi-color dispersion, from 0.1 wt. % to 10 wt. %, preferably from 0.2 wt. % to 7.5 wt. %, and preferably from 0.3 wt. % to 5 wt. %, a second polysaccharide.

Suitable second polysaccharides include, but are not limited to, gelatin, methyl cellulose, hydropropyl methyl cellulose, and the mixture thereof.

The weight ratio of the first polysaccharide to the second polysaccharide is from 1:3 to 3:1, preferably from 2:3 to 3:2.

Optionally, the multi-color dispersion of the present invention further comprises based on the total weight of the multi-color dispersion, from 0.1 wt. % to 1 wt. %, preferably from 0.1 wt. % to 0.6 wt. %, and most preferably, from 0.1 wt. % to 0.4 wt. %, an alginate. In the embodiment where alginate is comprised, the amount of the alginate is lower than that of the second polysaccharide.

The multi-color dispersion of the present invention further comprises based on the total weight of the multi-color dispersion, from 0.1 wt. % to 5 wt. %, preferably from 0.5 wt. % to 3 wt. %, an ionic complexing agent. The ionic complexing agent complexes with the first polysaccharide and produces a gel. Any ionic complexing agents that complex with the first polysaccharide and produce a gel can be used in this invention.

The illustrative examples of these ionic complexing agents include, but are not limited to, a phosphate, a hydrogen phosphate, a sulfate, borate, a citrate, and a chloride salt of $Mg^{2+}$, $Ca^{2+}$, $Zn^{2+}$, and $Ti^{4+}$ ions. Preferable examples are sodium borate, boric acid, and calcium chloride.

The multi-color dispersion of the present invention further comprises based on the total weight of the multi-color dispersion, from 30 wt. % to 99 wt. %, preferably from 40 wt. % to 98 wt. %, and preferably from 50 wt. % to 95 wt. %, a water.

The multi-color dispersion of the present invention further comprises based on the total weight of the multi-color dispersion, from 0.1 wt. % to 5 wt. %, preferably from 0.1 wt. % to 4 wt. %, and preferably from 0.1 wt. % to 3 wt. %, a first colorant, and from 0.1 wt. % to 5 wt. %, preferably from 0.1 wt. % to 4 wt. %, and preferably from 0.1 wt. % to 3 wt. %, a second colorant.

The colorants are organic or inorganic colorant particles, preferably inorganic colorant particles. The illustrative examples of the colorant particles include, but are not limited to, titanium dioxide white, carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, organic yellow, and any combination thereof. The colorants can also be particulate inorganic material which is capable of materially contributing to the opacity or hiding capability of a coating. Such materials typically have a refractive index of greater than 1.8 and include, but are not limited to, titanium dioxide ($TiO_2$), zinc oxide, zinc sulfide, barium sulfate, and barium carbonate. Preferred is titanium dioxide ($TiO_2$).

It is optionally that the colorant is used by mixing with extenders. As used herein, the term "extender" refers to a particulate inorganic material having a refractive index of less than or equal to 1.8 and greater than 1.3 and includes, for example, calcium carbonate, clay, calcium sulfate, aluminosilicates, silicates, zeolites, mica, diatomaceous earth, solid or hollow glass, and ceramic beads.

Optionally, to meet the requirements of different applications, the multi-color dispersion of the present invention further comprises from 0.1 wt. % to 5 wt. %, preferably from 0.1 wt. % to 4 wt. %, and preferably from 0.1 wt. % to 3 wt. %, based on the total weight of the multi-color dispersion, a third colorant, a forth colorant, and so on.

The total weight of all colorant particles in the multi-color dispersion is in a range of from 0.1 wt. % to 5 wt. %, preferably from 0.1 wt. % to 4 wt. %, and preferably from 0.1 wt. % to 3 wt. % based on the total weight of the multi-color dispersion.

Each colorant is separately protected in the particles in the multi-color dispersion. Usually each colorant is separately protected within the gel network of the first polysaccharide and the ionic complexing agent.

The multi-color dispersion of the present is prepared according to the following process:

In step i), contacting together a first colorant, a first aqueous dispersion of polymer particles, a first polysaccharide, and a second polysaccharide to make a first colorant dispersion; the first colorant comprises from 0.1 wt. % to 15 wt. %, preferably from 0.1 wt. % to 10 wt. %, and preferably from 0.1 wt. % to 5 wt. % of the first colorant dispersion, the first polymer particles comprise from 0.5 wt. % to 75 wt. %, preferably from 1 wt. % to 50 wt. %, most preferably from 5 wt. % to 40 wt. % of the first colorant dispersion, and the first and second polysaccharides each independently comprise from 0.1 wt. % to 15 wt. %, preferably from 0.1 wt. % to 10 wt. %, and most preferably from 0.1 wt. % to 5 wt. % of the first colorant dispersion.

The weight: weight ratio of the first polysaccharide to the second polysaccharide is from 1:3 to 3:1, preferably from 2:3 to 3:2.

Optionally, the making of the first colorant dispersion in the above step i) may further comprises a step of contacting from 0.1 wt. % to 1.6 wt. %, preferably from 0.1 wt. % to 1.2 wt. %, and most preferably from 0.1 wt. % to 0.8 wt. %, based on the total weight of the first colorant dispersion, an alginate.

In embodiments comprising an alginate, the amount of the alginate is less than that of the second polysaccharide.

After the preparation of the first colorant dispersion, the first colorant dispersion is stirred at 1500 rpm for 5 min. at room temperature and incubated at 90° C. with continuously stirring at 2000 rpm for 10 min. Then the first colorant dispersion is cooled by ice water bath with stirring at 2000 rpm for 10 min. The first colorant dispersion is transferred to plastic bottles with caps, and stored at 4° C.

In step ii), contacting the first colorant dispersion with a composition comprising a) a second aqueous dispersion of polymer particles and b) an ionic complexing agent to obtain a dispersion of protected first colorant particles; the polymer particles comprise from 0.5 wt. % to 75 wt. %, preferably from 1 wt. % to 50 wt. %, and most preferably from 5 wt. % to 40 wt. % of the composition, and the ionic complexing agent comprises from 0.1 wt. % to 10 wt. %, preferably from 0.1 wt. % to 7.5 wt. %, and most preferably from 0.1 wt. % to 5 wt. % of the composition.

The dispersion of protected first colorant particles is prepared under stirring at 100 rpm for 30 min.

In step iii), repeating steps i) and ii) with a second colorant that is different from the first colorant to obtain a dispersion of protected second colorant particles.

According to the requirements of different multi-color coating applications, a dispersion of protected third, fourth, fifth, sixth, and so on, colorant particles can be prepared by following the above process.

In step iv), mixing the dispersions of protected first and second colorant particles to obtain a multi-color dispersion. The first colorant and the second colorant are separately protected in particles formed by the gel network of the first polysaccharide and the ionic complexing agent, and said particles are dispersedly distributed within the multi-color dispersion.

The multi-color dispersion can be made into a coating composition before applications.

The coating composition of the present invention may further comprise at least one conventional coating additives including, but not limited to, coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, flowing agents, crosslinkers, and anti-oxidants.

Thickeners being used herein include, but are not limited to polyvinyl alcohol (PVA), hydrophobically modified alkali soluble emulsions (HASE), alkali-soluble or alkali swellable emulsions (ASE), hydrophobically modified ethylene oxide-urethane polymers known in the art as HEUR, cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Also useful as thickeners are fumed silica, attapulgite clay and other types of clay, and titanate chelating agents.

Dispersants being used herein include non-ionic, anionic and cationic dispersants such as polyacid with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. Prefer dispersants are the polyacids with suitable molecular weight. The polyacids used herein include, but are not limited to, homopolymers and copolymers based on polycarboxylic acids, including those that have been hydrophobically or hydrophilically modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and mixtures thereof. The molecular weight of such polyacids dispersant is from 400 to 50,000, preferably from 400 to 30,000, preferably from 500 to 10,000, preferably from 1,000 to 5,000 and preferably from 1,500 to 3,000.

Antifoaming agents and/or defoaming agents being used herein include, but are not limited to, silicone-based and mineral oil-based defoamers. Surfactants for use herein include anionic, nonionic, cationic surfactants and amphiphilic surfactant. Preferably anionic and nonionic surfactants, and more preferably, nonionic surfactants are used.

The biocides that can be used in the present invention are organic or inorganic biocides. Examples are described in U.S. Pat. No. 4,127,687 to DuPont, in U.S. Pat. No. 4,898,895 to Masuoka et al., and in WO1995032862A1. Preferably, the biocide(s) is with the active structure of Diiodomethyl-p-tolylsulfone, 4,5-Dichloro-2-octyl-2H-isothiazol-3-one (DCOIT), chloromethylisothiazolinone and methylisothiazolinone, or the mixture thereof.

The preparation of the coating composition involves the process of selecting and admixing appropriate coating ingredients in the correct proportions to provide coatings with specific processing and handling properties, as well as a final dry coating film with the desired properties.

The aqueous coating composition may be applied by conventional application methods including, but not limited to, brushing, roller application, and spraying methods such as air-atomized spray, air-assisted spray, airless spray, high volume low pressure spray, and air-assisted airless spray.

Suitable substrates include, but are not limited to, concrete, cement board, MDF and particle board, gypsum board, wood, stone, metal, plastics, wall paper and textile. Preferably, all the substrates are pre-primed by waterborne or solvent-borne primers.

EXAMPLES

I. Raw Materials

| Function | Ingredient/ Commercial Name | Supplier |
|---|---|---|
| Polysaccharide system | Alginate (Manucol DM) | FMC Company, Shanghai, China |
| | Gellan gum (fine grade) | Xinrong Company, Shanghai, China |
| | Guar (5500-6000 cP, 200 mesh) | Shree Ram Industries, Rajasthan, India |
| | Gelatin (fine grade) | Sinopharm Chemical Reagent Co., Ltd. Shanghai, China |
| | Synthetic layered silicate/ Laponite RDS | Rockwood Additives Limited, Gonzales, USA |

-continued

| Function | Ingredient/ Commercial Name | Supplier |
|---|---|---|
| Colorant | Red colorant | International Chemical Corporation ("ICC"), USA |
| | Blue colorant | International Chemical Corporation ("ICC"), USA |
| | Yellow colorant | International Chemical Corporation ("ICC"), USA |
| Aqueous dispersion of polymer particles | Polyacrylic emlusion/ Primal™AC 261C | The Dow Chemical Company, Midland, USA |
| Complexing agent | Sodium borate | Sinopharm Chemical Reagent Co., Ltd., Shanghai, China |
| | Calcium chloride | Sinopharm Chemical Reagent Co., Ltd., Shanghai, China |

II. Measurement Processes a) Strength and Appearance of the Colorant Protected Particles The strength and appearance of the colorant protected particles were evaluated by the "Particle Property Score" (PPS).

PPS is a numerical evaluation index for particle properties, and ranges from 1 to 5. PPS=1 means that particles are standard sphere balls and with high elasticity and strength; particles can be easily picked up by hand. PPS=2 means that particles are irregular in shape with high elasticity and strength; particles can be easily picked up by hand. PPS=3 means that particles are irregular in shape and with soft texture; individual particles cannot be picked up by hand. PPS=4 means that particles are flat and slice in shape, look like scraps of paper, and with soft texture; particles can be coated on a substrate but with obvious roughness. PPS=5 means that particles are flat and slice in shape, look like scraps of paper, and are of soft texture; particles can be coated on a substrate with high plainness.

Particles with PPS lower than 3 (including 3) will block the nozzle of spraying equipment, and the coating surface formed is rough and unnatural. They are not fit for multi-color applications. Particles with PPS equal to 4 or 5 are compatible with spraying equipment, and the coating surface formed is natural and smooth. They are acceptable for multi-color applications.

b) Colorant Protection in Binder Systems

Colorant protection was measured by naked eyes and UV-VIS spectrometers. Eye observation was used to directly evaluate the protection of colorant. If color was observed to be released from protected particles in water by naked eyes, the colorant was not protected well. On the contrary, if no color release was observed in water, colorants were deemed as well protected by particles. Furthermore, UV-VIS spectrometer (UV-3600 from Shimadzu, Japan) was utilized to measure the colorant protection capability. After colorant protected particles are picked up, the residue dispersion was extracted to test the visual spectra (wavelength ranging from 300 to 800 nm). The average absorption value (Abs.) was detected for measuring color release behavior. High average absorption value indicates more colorant release. If there is no absorption in the spectra, the average absorption value is equal to that of de-ionized water.

c) Colorant Protection in Latex Films

Grey value was used to measure colorant protection in latex films.

When working with polyacrylic systems, colorant protection capability was measured by the grey value of its dry latex film. The film was scanned with high resolution digital scanner ("PERFECTION V500 PHOTO™" produced by Epson). Open source software Image J was utilized to calculate the average grey value to quantitatively describe the transparency of the latex film. Higher grey value of latex films indicates higher transparency.

III. Preparation Methods a) Preparation of the First Mixture

Polysaccharide powder was dispersed into water by stirring at 1500 rpm for 5 min. at room temperature to form a solution. The solution was incubated at 90° C. and continuously stirred at 2000 rpm for 10 min., and cooled by ice water bath with stirring at 2000 rpm for 10 min. The prepared polysaccharide solution was transferred to plastic bottles with caps, and stored at 4° C. Add an aqueous dispersion of polymer particles, Primal™ AC 261C (with polymer content being 50%) and a colorant into the prepared polysaccharide solution with stirring at 2000 rpm for 20 min.

b) Preparation of the Second Mixture

Salt was dissolved in de-ionized water with stirring at 100 rpm for 30 min. to form a salt solution. Mix the salt solution with an aqueous dispersion of polymer particles, Primal™ AC 261C (with polymer content being 50%) with stirring at 2000 rpm for 30 min. c) Preparation of a single-colorant protected binder dispersion Drop about 10 g of the first mixture into about 30 g of the second mixture with low speed stirring at 100 rpm for 5 min. The produced binder dispersion is composed of two parts: single-colorant protected particles and the dispersion. It is named as a dispersion comprising particles with a single-colorant protected.

d) Preparation of a Multi-Colorant Dispersion

For each of different colorants, repeat method a) to c). Mix the single-colorant protected binder dispersions (including both particles and dispersions) prepared according to method c) together, and the colorant in each binder system is different. The resultant binder dispersion is named as a multi-color dispersion.

e) Preparation of a Latex Film

The multi-colorant dispersion prepared according to method d) was applied onto a white paper substrate by dipping process (about 0.1 g/cm$^2$) and air-dried.

IV. Experimental Examples

TABLE 1

| Examples | Step i) components (wt. % based on the colorant dispersion) | | | Step ii) components (wt. % based on the composition) | |
|---|---|---|---|---|---|
| | Polysaccharide | Primal ™ AC 261C | Colorant | Salts | Primal ™ AC 261C |
| 1# | 1% Alginate | 19% | 1% Yellow | 0.5% Calcium chloride | 5% |
| 2# | 1% Gellan | | | 0.5% Calcium chloride | |
| 3# | 1% Guar | | | 4% Sodium borate | |
| 4 | 1% Guar + 0.43% Gelatin | | | 4% Sodium borate | |
| 5 | 1% Guar + 0.43% Gelatin + 0.14% Alginate | | | 4% Sodium borate | |
| 6 | 1% Gelatin + 1% Guar | | | 4% Sodium borate | |
| 7 | 1.33% Gelatin + 0.67% Guar | | | 4% Sodium borate | |
| 8# | 1.6% Gelatin + 0.4% Guar | | | 4% Sodium borate | |
| 9 | 0.67% Gelatin + 1.33% Guar | | | 4% Sodium borate | |
| 10# | 0.4% Gelatin + 1.6% Guar | | | 4% Sodium borate | |
| 11# | 2.2% Alginate | | 0.33% Yellow; 0.33% Blue; and 0.33% red | 0.5% Calcium chloride | |
| 12# | 2.2% Laponite RDS | | | 4% Sodium borate | |
| 13# | 2.2% Guar | | | 4% Sodium borate | |
| 14 | 1.4% Guar + 0.6% Gelatin + 0.2% Alginate | | | 4% Sodium borate | |
| 15# | 2.2% Alginate | | | 0.5% Calcium chloride | |
| 16# | 2.2% Laponite RDS | | | 2% Sodium borate | |
| 17# | 2.2% Guar | 50% | | 2% Sodium borate | 99.5% |
| 18 | 1.4% Guar + 0.6% Gelatin + 0.2% Alginate | | | 2% Sodium borate | 98% |

Comparative examples.

Examples 1 to 10 are single-colorant protected binder dispersions prepared according to the above preparation methods a) to c), with each component listed in the above table.

Examples 12 to 18 are multi-colorant dispersions prepared according to the above preparation method d); and examples 17 to 18 are further made into latex films according to method e).

V. Results

1. Comparison for Different Kinds of Polysaccharides

Examples 1 to 5 were used for the comparison of different polysaccharides.

As shown in Table 1, Comparative example 1 (example 1#) and comparative example 2 (example 2#) use polysaccharides outside of the invention, and comparative example 3 (example 3#) uses only a first polysaccharide. Inventive examples 4 and 5 use both first and second polysaccharides, with inventive example 5 having alginate. The particles of all these examples were picked up for PPS measurement, and the residue dispersions were detected under UV-VIS spectrometer and by naked-eyes. Results are shown in Table 2. Comparative examples 1 and 2 have good colorant protection (with no observed colorant release and average absorption value in the dispersion close to that of de-ionized water), but poor PPS scores. Poor PPS scores indicate that the surface looks rough and unnatural. Comparative example 3 has a better PPS score, but its colorant particles are not well protected: colorant release is observed by naked eyes, and average absorption value of its dispersion is high.

TABLE 2

| Examples | Colorant Release (by naked eyes) | Average Absorption value* | PPS |
|---|---|---|---|
| 1# | No | 0.005 | 1 |
| 2# | No | 0.082 | 2 |

TABLE 2-continued

| Examples | Colorant Release (by naked eyes) | Average Absorption value* | PPS |
|---|---|---|---|
| 3# | Yes | 3.453 | 4 |
| 4 | No | 0.377 | 5 |
| 5 | No | 0.325 | 5 |

Comparative examples;
*The average absorption value of de-ionized water is -0.040.

In contrast to comparative examples 1 to 3, inventive examples 4 and 5 achieve both better colorant protection and better appearance and strength of the final product.

2. Comparison of Different Ratios of Two Kinds of Polysaccharides

Examples 6 to 10 were used for the comparison of polysaccharides ratios.

As shown in Table 1, the ratios of the first polysaccharide (guar) to the second polysaccharide (gelatin) of comparative examples 8 (example 8#) and 10 (example 10#) are 0.25 and 4, respectively; while the ratios of the first polysaccharide (guar) to the second polysaccharide (gelatin) of inventive examples 6, 7, and 9 are 1, 0.5, and 2, respectively. The particles of all these examples were picked up for PPS measurement, and the residue dispersions were detected by naked eyes. Results are shown in Table 3. Comparative examples 8 (example 8#) and 10 (example 10#) have poor colorant protection ability compared with inventive examples 6, 7, and 9.

TABLE 3

| Examples | Colorant Release (by naked eyes) | PPS |
|---|---|---|
| 6 | No | 5 |
| 7 | No | 5 |
| 8# | Yes | 5 |

TABLE 3-continued

| Examples | Colorant Release (by naked eyes) | PPS |
|---|---|---|
| 9 | No | 4 |
| 10# | Yes | 3 |

Comparative examples;
*The average absorption value of de-ionized water is −0.040.

3. Performance of Multi-Colorant Binder Applications

Examples 11 to 18 were made of multi-colorant binder systems according to method d) for performance measurement. As shown in Tables 1 and 4, only inventive examples (examples 14 and 18) using both first polysaccharide (guar) and second polysaccharide (gelatin) in a ratio within the range of this invention have both great PPS scores and colorant protection. Inventive examples 14 and 18 also comprise alginate.

TABLE 4

| Examples | Colorant Release (by naked eyes) | Average Absorption Value* | PPS | Grey Value§ |
|---|---|---|---|---|
| 11# | No | 0.020 | 1 | N/A |
| 12# | Yes | N/A | 1 | |
| 13# | Yes | 4.051 | 4 | |
| 14 | No | 0.405 | 5 | |
| 15# | No | N/A | 1 | 113 |
| 16# | Yes | N/A | 1 | N/A |
| 17# | Yes | N/A | 5 | 94 |
| 18 | No | N/A | 5 | 107 |

Comparative examples;
*The average absorption value of de-ionized water is −0.040;
§The grey value of substrate background is 116.

Grey value of the inventive example 18 is very close to that of substrate background, and is acceptable for this application.

4. Stability of the Binder System

Stability of the binder systems is tested by the speed up test.

Inventive example 18, after preparation, was kept at 50° C. for one month. Colorant protected particles were picked up and the residual dispersion was extracted and compared with original aqueous dispersion of polymer particles, Primal™ AC 261C. No significant color change was observed (the grey value of one-month-later example 18 was 153, while that of the original latex binder was 158). Colorants are well protected (not released) after storage for one month. In Thus, the inventive binder systems are stable and suitable for multi-color coating applications.

The invention claimed is:

1. A process for making a multi-color dispersion comprising:
   i) contacting together
   a first colorant,
   a first aqueous dispersion of polymer particles comprising a polymerized product of at least one ethylenically unsaturated nonionic monomer comprising (meth)acrylic esters,
   two or more of a first polysaccharide selected from the group consisting of guar, pectin, and carrageenan, and
   two or more of a second polysaccharide selected from the group consisting of gelatin, methyl cellulose, and hydroxypropyl methyl cellulose to make a first colorant dispersion;
   wherein the first colorant dispersion comprises from 0.1 wt. % to 5 wt. % of the first colorant, from 1 wt. % to 60 wt. % of the first aqueous dispersion of polymer particles, and from 0.1 wt. % to 10 wt. % each independently of the first and second polysaccharide;
   ii) contacting the first colorant dispersion with a composition comprising
   a) a second aqueous dispersion of polymer particles comprising a polymerized product of at least one ethylenically unsaturated nonionic monomer and
   b) an ionic complexing agent to obtain a dispersion of protected first colorant particles;
   wherein the composition comprises from 0.5 wt. % to 75 wt. % of the second aqueous dispersion of polymer particles, and from 0.1 wt. % to 5 wt. % of the ionic complexing agent, and wherein the ionic complexing agent comprises a phosphate, a hydrogen phosphate, a sulfate, borate, a citrate, or a chloride salt of $Mg^{2+}$, $Ca^{2+}$, $Zn^{2+}$, or $Ti^{4+}$, sodium borate, or boric acid;
   iii) repeating steps i) and ii) with a second colorant that is different from the first colorant to obtain a dispersion of protected second colorant particles; and
   iv) mixing the dispersions of protected first and second colorant particles to obtain a multi-color dispersion;
   wherein the weight: weight ratio of the first polysaccharide to the second polysaccharide is from 1:3 to 3:1; and
   wherein all weight percents are based on the total weight of the multi-color dispersion.

2. The process for making the multi-color dispersion according to claim 1 wherein the first colorant dispersion further comprises from 0.1 wt. % to 1.6 wt. %, based on the total weight of the first colorant dispersion, an alginate, wherein the amount of the alginate is less than that of the second polysaccharide.

3. A multi-color dispersion comprising a dispersion of protected first colorant particles and a dispersion of protected second colorant particles, wherein the multi-color dispersion comprises:
   a) a first aqueous dispersion of polymer particles comprising from 1 wt. % to 60 wt. %, based on the total weight of the multi-color dispersion, of polymer particles comprising a polymerized product of at least one ethylenically unsaturated nonionic monomer comprising (meth)acrylic esters;
   b) from 0.1 wt. % to 10 wt. %, based on the total weight of the multi-color dispersion, of two or more of a first polysaccharide selected from the group consisting of guar, pectin, and carrageenan;
   c) from 0.1 wt. % to 10 wt. %, based on the total weight of the multi-color dispersion, of two or more of a second polysaccharide selected from the group consisting of gelatin, methyl cellulose, and hydroxpropyl methyl cellulose;
   d) from 0.1 wt. % to 5 wt. %, based on the total weight of the multi-color dispersion, of an ionic complexing agent, wherein the ionic complexing agent comprises a phosphate, a hydrogen phosphate, a sulfate, borate, a citrate, or a chloride salt of $Mg^{2+}$, $Ca^{2+}$, $Zn^{2+}$, or $Ti^{4+}$, sodium borate, or boric acid;
   e) from 0.1 wt. % to 5 wt. %, based on the total weight of the multi-color dispersion, of a first colorant; and
   f) from 0.1 wt. % to 5 wt. %, based on the total weight of the multi-color dispersion, of a second colorant;
   wherein the weight: weight ratio of the first polysaccharide to the second polysaccharide is from 1:3 to 3:1,
   wherein cosolvents are absent from the multi-color dispersion, and wherein the multi-color dispersion is prepared by:
(i) contacting together the first colorant, the first aqueous dispersion of polymer particles, the first polysaccharide, and the second polysaccharide to make a first colorant dispersion;
(ii) contacting the first colorant dispersion with a composition comprising
   (a) a second aqueous dispersion of polymer particles comprising a polymerized product of at least one ethylenically unsaturated nonionic monomer comprising (meth)acrylic esters and
   (b) the ionic complexing agent to obtain a dispersion of protected first colorant particles;
(iii) repeating steps (i) and (ii) with the second colorant to obtain a dispersion of protected second colorant particles; and
(iv) mixing the dispersions of protected first and second colorant particles to obtain a multi-color dispersion.

4. The multi-color dispersion according to claim 3 wherein it further comprises from 0.1 wt. % to 1 wt. % based on the total weight of the multi-color dispersion, an alginate, and the amount of the alginate is less than that of the second polysaccharide.

5. A coating composition comprising the multi-color dispersion according to claim 3.

6. The multi-color dispersion according to claim 3, wherein the ionic complexing agent is a borate salt of $Mg^{2+}$, $Ca^{2+}$, $Zn^{2+}$, or $Ti^{4+}$, sodium borate, or boric acid.

7. A multi-color dispersion comprising a dispersion of protected first colorant particles and a dispersion of protected second colorant particles, wherein the dispersion of protected first colorant particles comprises:
   a first colorant dispersion comprising:
      from 0.1 wt. % to 5 wt. % of a first colorant;
      from 0.5 wt. % to 75 wt. % of first polymer particles;
      from 0.1 wt. % to 10 wt. % of two or more of a first polysaccharide selected from the group consisting of guar, pectin, and carrageenan; and
      from 0.1 wt. % to 10 wt. % of two or more of a second polysaccharide selected from the group consisting of gelatin, methyl cellulose, and hydroxypropyl methyl cellulose;
      from 0.5 wt. % to 75 wt. % of a second aqueous dispersion of polymer particles; and
      from 0.1 wt. % to 10 wt. % of an ionic complexing agent comprising a phosphate, a hydrogen phosphate, a sulfate, borate, a citrate, or a chloride salt of $Mg^{2+}$, $Ca^{2+}$, $Zn^{2+}$, or $Ti^{4+}$, sodium borate, or boric acid; and
the dispersion of protected second colorant particles comprises:
   a second colorant dispersion comprising:
      from 0.1 wt. % to 5 wt. % of a second colorant;
      from 0.5 wt. % to 75 wt. % of first polymer particles;
      from 0.1 wt. % to 10 wt. % of two or more of a first polysaccharide selected from the group consisting of guar, pectin, and carrageenan; and
      from 0.1 wt. % to 10 wt. % of two or more of a second polysaccharide selected from the group consisting of gelatin, methyl cellulose, and hydroxypropyl methyl cellulose;
   from 0.5 wt. % to 75 wt. % of a second aqueous dispersion of polymer particles; and
   from 0.1 wt. % to 10 wt. % of an ionic complexing agent comprising a phosphate, a hydrogen phosphate, a sulfate, borate, a citrate, or a chloride salt of $Mg^{2+}$, $Ca^{2+}$, $Zn^{2+}$, or $Ti^{4+}$, sodium borate, or boric acid,
   wherein the weight: weight ratio of the first polysaccharide to the second polysaccharide is from 1:3 to 3:1.

8. The multi-color dispersion according to claim 7 wherein the multi-color dispersion further comprises from 0.1 wt. % to 1 wt. % based on the total weight of the multi-color dispersion, of an alginate, and the amount of the alginate is less than the amount of the second polysaccharide.

9. A coating composition comprising the multi-color dispersion according to claim 7.

* * * * *